(12) United States Patent
Erickson et al.

(10) Patent No.: US 9,658,924 B2
(45) Date of Patent: May 23, 2017

(54) EVENT DATA MERGE SYSTEM IN AN EVENT HISTORIAN

(71) Applicant: Invensys Systems, Inc., Foxboro, MA (US)

(72) Inventors: Brian Kenneth Erickson, Long Beach, CA (US); Bala Kamesh Sista, Lake Forest, CA (US); Abhijit Manushree, Laguna Niguel, CA (US); Vinay T. Kamath, Rancho Santa Margarita, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 97 days.

(21) Appl. No.: 14/569,238

(22) Filed: Dec. 12, 2014

(65) Prior Publication Data

US 2016/0170838 A1    Jun. 16, 2016

(51) Int. Cl.
| G06F 12/00 | (2006.01) |
| G06F 13/00 | (2006.01) |
| G06F 13/28 | (2006.01) |
| G06F 11/14 | (2006.01) |
| G06F 17/30 | (2006.01) |

(52) U.S. Cl.
CPC ...... *G06F 11/1453* (2013.01); *G06F 11/1435* (2013.01); *G06F 11/1469* (2013.01); *G06F 17/30088* (2013.01); *G06F 17/30309* (2013.01); *G06F 2201/84* (2013.01)

(58) Field of Classification Search
CPC ...... G06F 11/16; G06F 11/14; G06F 11/1453; G06F 11/1435; G06F 11/1469; G06F 17/30309; G06F 17/30088; G06F 2201/84
USPC .................................................. 711/161, 162
See application file for complete search history.

(56) References Cited

U.S. PATENT DOCUMENTS

| 2006/0265426 A1* | 11/2006 | Chen .................. G06F 17/30067 |
| 2012/0110287 A1* | 5/2012 | Han ...................... G06F 3/0617 711/162 |
| 2013/0304701 A1* | 11/2013 | Torimaru ............ G06F 11/1448 707/641 |
| 2014/0188870 A1* | 7/2014 | Borthakur ......... G06F 17/30312 707/736 |
| 2015/0066857 A1* | 3/2015 | Dayal ............... G06F 17/30088 707/639 |
| 2015/0229715 A1* | 8/2015 | Sankar ................ H04L 41/0893 709/203 |

* cited by examiner

*Primary Examiner* — Yaima Rigol
*Assistant Examiner* — Shane Woolwine
(74) *Attorney, Agent, or Firm* — Stephen Manetta; Susmita Bhandari

(57) ABSTRACT

An event historian system merges stored event data snapshots into sorted event storage blocks. The system determines that a storage block contains a plurality of snapshots to be merged. A new snapshot is created into which the plurality of snapshots will be merged. The event data within the snapshots is combined and recorded into the new snapshot in a sorted order. The index files within the snapshots are combined and recorded into the new snapshot.

20 Claims, 7 Drawing Sheets

EVENT DATA MERGE SYSTEM IN AN EVENT HISTORIAN

BACKGROUND

Aspects of the present invention generally relate to the field data storage in a process control system environment. Industry increasingly depends on computer systems to control industrial processes and to monitor those processes. There is great value in storing the data generated by an industrial process and using that data to understand and possibly improve the efficiency of the process. Analysis of the stored data can lead to faster response time when a process breaks down and greater ability to predict when downtime may be necessary. Bottlenecks in the process of a facility may be recognized and addressed to increase overall productivity.

Typical industrial processes are extremely complex and generate enormous amounts of data every day. To store all of the data and make it accessible to those who need it is no small task. Events that occur in the process must be tracked and stored at a high rate of accuracy and they should be accessible to other systems throughout the process facility or facilities. Due to this complexity, it is a difficult but important task to provide an event historian system that can quickly and accurately record event data as it occurs and provide results to queries of the stored data in a responsive manner.

SUMMARY

Briefly, aspects of the invention permit access to stored industrial process data, including event data recorded as events occur, and provide results to queries of the stored data in a responsive manner.

In one form, an event historian system merges stored event data snapshots into sorted event storage blocks. Software instructions stored on a memory device are executed on a processor. The system determines that a storage block contains a plurality of snapshots to be merged. A new snapshot is created into which the plurality of snapshots will be merged. The event data within the snapshots is combined and recorded into the new snapshot in a sorted order. The index files within the snapshots are combined and recorded into the new snapshot.

In another form, software instructions are stored on one or more tangible, non-transitory computer-readable media and are executable by a processor. In another form, a processor executable method is provided.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

The described system is an event historian system that uses a novel storage method to enable efficient recording of gathered event data and retrieving of stored event data. The event historian receives the event data from one or more different client systems, potentially at various locations, and stores the data quickly and accurately. The use of block data storage, described below, enables the system to more quickly respond to queries from client systems as well.

Block Data Storage

Figure 1:
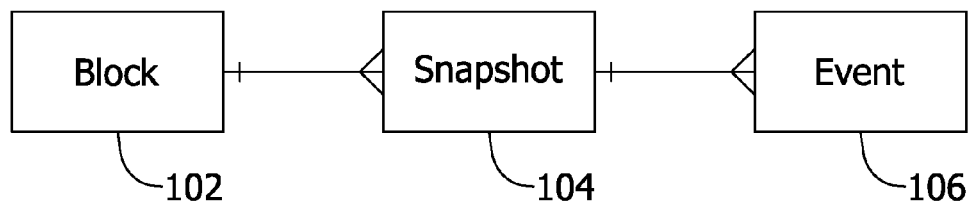
FIG. 1 is a diagram depicting the relationship between storage blocks, snapshots, and event data.

In a form of the invention, event data gathered from a process control system is stored in an event historian module in storage blocks. The event historian may contain many different storage blocks. FIG. 1 shows the relationships between storage blocks, snapshots, and event data. The storage blocks 102 may be in the form of folders or directories created on a memory storage device. Each storage block 102 stores event data 106 of a particular group. Storage blocks 102 may store event data 106 based on the time the event occurred. A storage block 102 may store all of the event data 106 that occurs in the system for a particular hour, group of hours, day, week, or some other defined amount of time. For instance, there may be a specific storage block 102 for each hour of time that the process control system is in operation.

The storage blocks 102 consist of snapshots 104. Snapshots 104 cover a part of the event data set covered by the storage block 102 and are dynamic as to what they contain. For instance, if a storage block 102 stores event data 106 from a certain hour of time, there might be a snapshot 104 for the first minute or the first ten minutes. Snapshots 104 are temporary and dynamic and can overlap with other snapshots 104. For instance, one snapshot 104 may be from the beginning of the hour to ten minutes in, while another snapshot 104 may be from the fourth minute to the fifteenth minute. Snapshots 104 may contain duplicate event data as well. Duplicate event data is handled during the merge process, which is discussed at length later.

Figure 7:
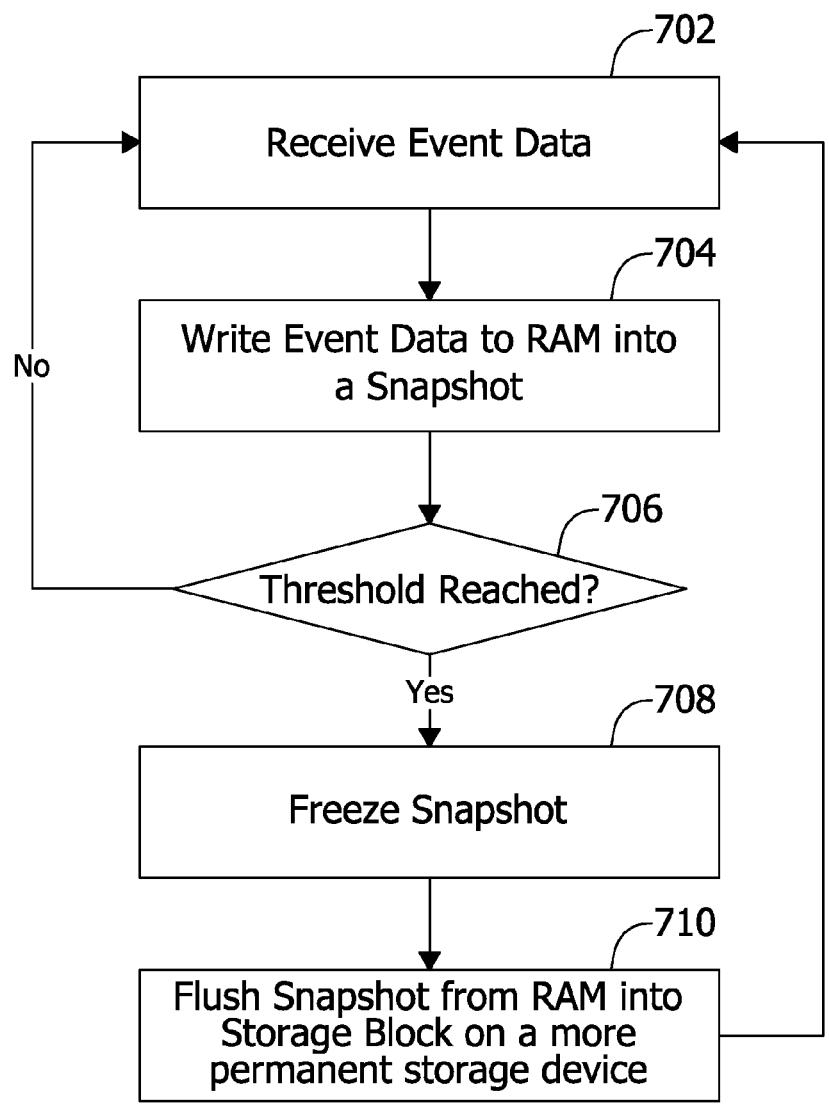
FIG. 7 is a flowchart depicting the flow of event data into a snapshot and then later into a storage block.

Event data 106 may be in the form of individual events and may comprise properties such as the type of the event, the time of the occurrence of the event (timestamp), and other properties relevant to the event. FIG. 7 shows the flow of event data through the described system. Upon being received by the system (step 702), event data 106 is written to a snapshot which is maintained in random access memory (RAM) (step 704) until a certain threshold has been met. The system monitors the threshold (step 706) to determine whether to continue writing event data to RAM or flush the snapshots to a memory storage device. Snapshots 104, once created and populated, are frozen so that they cannot be altered or added to by an outside source (step 708). Once frozen in this way, the snapshots 104 can be merged with other snapshots 104 and the event data 106 therein sorted. Then, snapshot 104 containing the event data 106 that has been held temporarily in RAM is written to a hard disk or other more permanent memory storage device all at one time (step 710). In an embodiment, event data 106 and snapshots 104 are held temporarily in the RAM of a computer system until a certain number of entries of event data 106 are stored. Once that threshold is met, the event data 106 and snapshots 104 held in RAM are transferred or flushed from RAM to the event historian and recorded into a storage block 102. Event data 106 and snapshots 104 may be held in RAM for a certain timeframe where the end of the timeframe acts as the threshold in step 706. At the end of the timeframe, the collected event data 106 and snapshots 104 in RAM are transferred to the event historian to be stored in a storage block 102. Other thresholds that may result in flushing of the RAM may include if a certain percentage of the RAM is occupied by event data or in the event of a system shutdown. Other factors may result in event data being kept in RAM longer, including if the event data is being accessed by the system frequently.

The flushing of the snapshots from the RAM clears the RAM to create more snapshots and receive more event data. The freezing of the snapshots 104 may cause the event historian system to create many different snapshots 104, some of which may overlap. The event historian system does not sort the data as it arrives, but rather leaves that task to the merge process which runs in the background. The event historian system simply accepts data that is sent and places it in a fitting snapshot 104 without concern for what sort of event data it may be or whether there is duplicate data. Due to the simplicity of the process, the event historian system is able to accept data from the connected systems at an efficient rate.

The event historian system accepts data in a wide variety of formats. The type of data that makes up an event is divided into a plurality of properties. The event historian accepts data that comprises a set of built-in properties and also data that may have other optional extended properties. The system is capable of recognizing extended properties as they are being recorded, enhancing the flexibility of the system in storing event data. For example, event data may be represented by the built-in properties listed in Table 1 and extended properties using prefixes like those listed in Table 2. These lists are not limiting, but rather exemplary of what properties may be used by the system to store event data.

TABLE 1

Built-in Data Properties

| Property Name | Fixed Data Type |
| --- | --- |
| Area | String |
| DisplayText | String |
| EventTime | DataTime |
| EventType | String |
| Id | System.Guid |
| IsAlarm | Bool |
| Priority | Ushort |
| Severity | Ushort |
| Source | String |
| System | String |

In Table 1, there are ten basic properties which are of certain recognized data types. An embodiment of the event historian system may have a different list of built-in properties with different data types as well. Each event will be stored on the system having each of the built-in properties, though for certain events, the properties may not all be useful. For instance, there may be events that do not have a "severity", and so that property may be recorded with a value indicating that the property is not used for the event. Additional extended properties may also be included in a given event.

TABLE 2

Extended Data Property Prefixes

| Data Type | Prefix to PropertyName |
| --- | --- |
| Blob | 00 |
| Boolean | 01 |
| Byte | 02 |
| Date | 03 |
| DateTime | 04 |
| Decimal | 05 |
| Double | 06 |
| Duration | 07 |
| Float | 08 |
| Guid | 09 |
| Hex | 10 |
| Int | 11 |
| Integer | 12 |
| Long | 13 |
| Short | 14 |
| String | 15 |
| Time | 16 |
| UnsignedByte | 17 |
| UnsignedInt | 18 |
| UnsignedLong | 19 |
| UnsignedShort | 20 |

The method of handling extended properties in the event historian system uses prefixes appended onto the property name like those shown in Table 2. Extended properties must have a name, but there is no requirement that the name indicate what type of data the property represents, so the proper prefix may be appended to enable the system to handle the data of that property. For instance, if an event included a property of "Temperature" and the property is represented in a double, the system may append "06" to "Temperature", forming the "06Temperature" property. In this way, the system can properly handle new extended properties. The number of extended properties that may be included for an event may be limited to ensure system efficiency. For instance, an embodiment of the event historian system may limit the number of extended properties on an event to 50 or some similar value based on the capabilities of the system.

Extended properties may have the same property name and different types. For instance, there may be a Temperature property that is expressed as a Double and there may be another Temperature property that is expressed as an Int. These properties would be distinguishable as the first would be recorded as "06Temperature" and the second as "11Temperature".

The system may store snapshot data in separate folders within the snapshot based on data type prior to the data being merged. The system need not store a "data type" value for each individual data record, but rather simply keep track of data type at the folder level. If an event arrives in the system with a previously unknown property data type, the system will create a new folder for that data type and store the property there. This arrangement may be altered later after the merge process has run through the data.

In the case of event property data represented as a string of characters, case of the letters is stored and preserved. For instance, property values of "TRUE", "True", and "true" are all separate values and maintained as such in the event historian system. Upon a query for "true" property values, all three event properties would be returned in their case sensitive form. This ensures that no information is lost in converting the case of characters to lowercase or uppercase while also ensuring that queries do not need to account for a variety of different cases when searching for or filtering for string-based properties.

The event historian system can receive data from many different data sources simultaneously. The data received from different sources may be placed into the same storage block and possibly the same snapshot. The source of a given event data record may be preserved in the built-in properties of the event data record itself. The event historian system can handle data from many different sources within the same process facility or even data sources in different geographic locations. The simplicity of the data reception technique does not change significantly with the inclusion of multiple data sources. The processing and sorting of the data is done by the system in the merge process or upon query. Both processes are described in detail below.

The event historian system may be combined with a process historian system which stores general process data as well. General process data is typically measurements and values that are gathered from the process control system at regular intervals. Event data, rather than be gathered at regular intervals, is triggered on the given event occurring. For example, a device that gathers a temperature measurement every minute is gathering general process data, whereas a device that sets off an alarm when the temperature of the unit crosses a certain threshold is gathering event data. The event data and process data may be stored in the same storage blocks for each timeframe and the event data may be separated from the process data in the storage blocks by storing it in a separate folder. The event historian can obtain information about the process control system from the process historian system as well as receiving updates when the process control system modified. The storage blocks in this combined system function in a similar manner as described above, including dynamic creation of snapshots to contain subsets of data within the storage blocks. If the event historian receives event data for a storage block that has not been created yet, the event historian will store the data in a temporary location and indicate that the storage block should be created. Upon the requested storage block being created, the event historian will flush the temporarily stored event data into the storage block in the proper snapshot format.

Due to the event data and process data being stored in the same Historian system, client systems can request and receive both types of data easily, and the combination of the process data with the event data enables the Historian system to put the events in context with what occurred in the process system at the time when the event data was recorded. For instance, when displaying a graph showing the change in process data values over time, the system can overlay event information on the graph indicating the time at which the event occurred. The events could appear as icons at or near the time on the graph at which the corresponding event occurred.

When storing the event data, the event historian system may use a form of data compression to increase storage efficiency. The Common Bytes Encoder (CBE) module analyzes large sections of event data to determine shared patterns that take place in the same location among each of the event data records. The CBE keeps track of each shared pattern and its location in the event data records and stores the information in a separate CBE file. The event historian system may then remove the shared patterns from the event data records for storage and store those event data records with the associated CBE file. In this way, the shared patterns are only stored in one place in this embodiment, while the event data records have each been shortened by the length of the shared patterns. Event data tends to contain many of these shared patterns across hundreds or thousands of event data records. The CBE module is capable of significantly increasing storage efficiency through this process.

The event historian system may include an abstraction layer between the storage block system and the client systems sending data to be stored. The abstraction layer enables the event historian system to make use of a storage block system as described here as well as a more conventional historian database utilizing SQL or other similar database language. The two historian systems may be used in parallel or there may be some method used to determine in which system to store received event data. The client systems are unaware of this process due to the abstraction layer.

Figure 2:
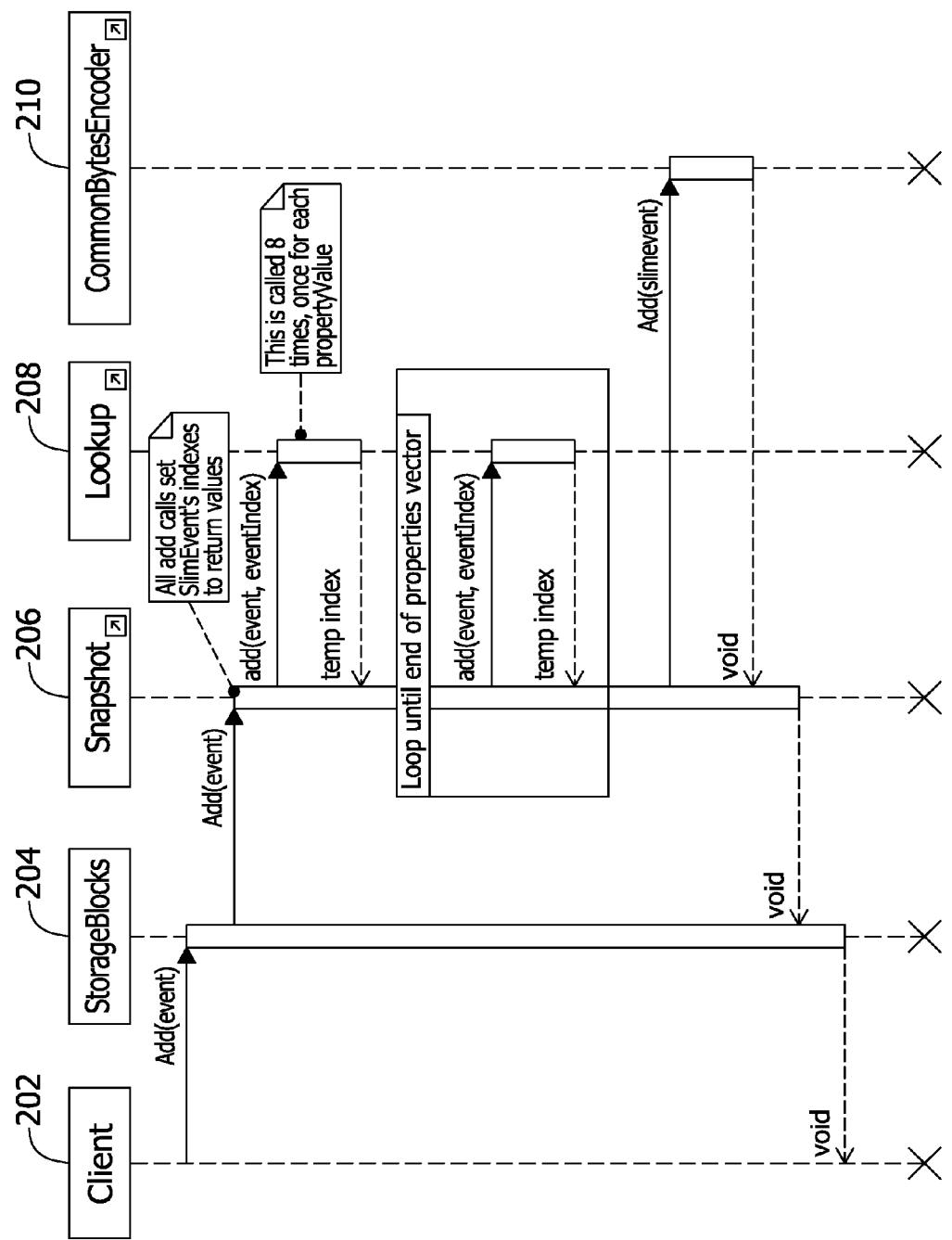
FIG. 2 is a diagram depicting the process of adding an event to the event historian system.

FIG. 2 is a diagram describing the process of adding an event to a snapshot in the event historian system. A client system 202 begins the process by sending an event to the event historian system to be inserted into a storage block 204. The event historian system determines which storage block 204 the event belongs in based on the time of the occurrence of the event. The system then determines a snapshot 206 for the event, possibly creating a new snapshot 206 as necessary. The system then sends the event property data to a lookup process 208 which sorts the property data of the event into several different files to enable fast and reliable lookup upon receiving a query. These files represent the index file set portion of the event historian system, which is described in detail below. The lookup process 208 is executed for each property within the event. Upon completion of the lookup process 208, the event is sent to the Common Bytes Encoding module 210. As described above, the event will be analyzed for common patterns when compared with a group of similar events and those common patterns will be saved in a separate file and removed from the event itself. Upon completion of the Common Bytes Encoding process 210, the event has been successfully added to the snapshot 206.

Figure 3:
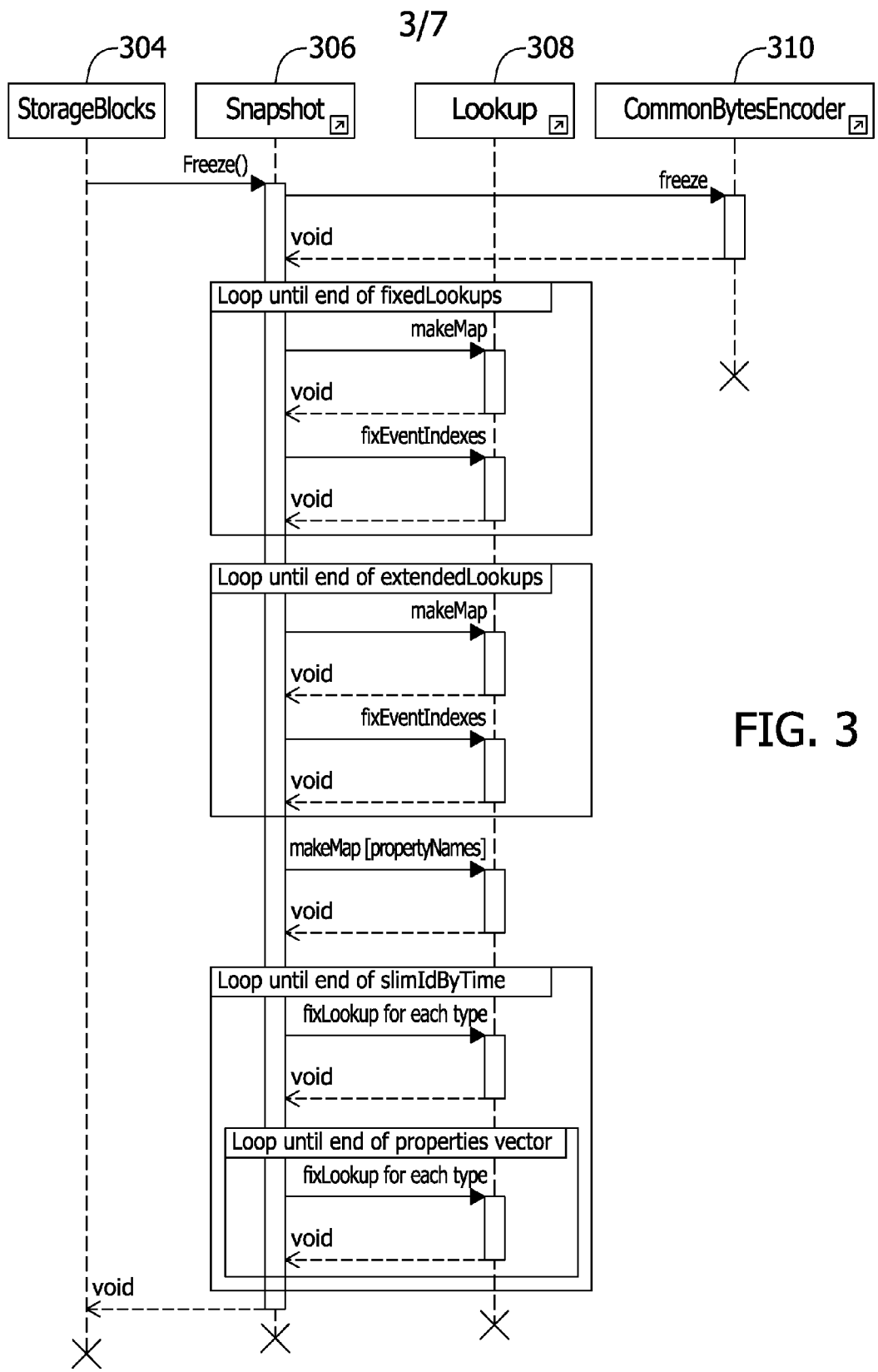
FIG. 3 is a diagram depicting the process of freezing a snapshot in a storage block.

FIG. 3 is a diagram describing the process of "freezing" a snapshot. When snapshot has been deemed full or has received event data for a sufficient period of time, it is frozen to ensure that no additional data is added or altered. Freezing the snapshot finalizes the indices assigned to various property data and allows the system to create additional mapping files of the data to enable fast, efficient lookup when queried. The storage block 304 sends the freeze command to the snapshot 306 and the snapshot 306 stops receiving additional event data. The freeze command is sent to the Common Bytes Encoder module 310, finalizing the common patterns stored in the CBE file. The lookup process 308 goes through each property that has been stored for the stored event data and creates index maps for fast access of each instance of the property. Lookup process 308 begins with the built-in or fixed properties that are present on each event record and then also processes the extended properties. During the process for each property, indices mapping the properties are updated for accuracy. An index map is then created for property names, including both the built-in and extended properties. A map is also created to ensure efficient lookup of properties by type.

Figure 4:
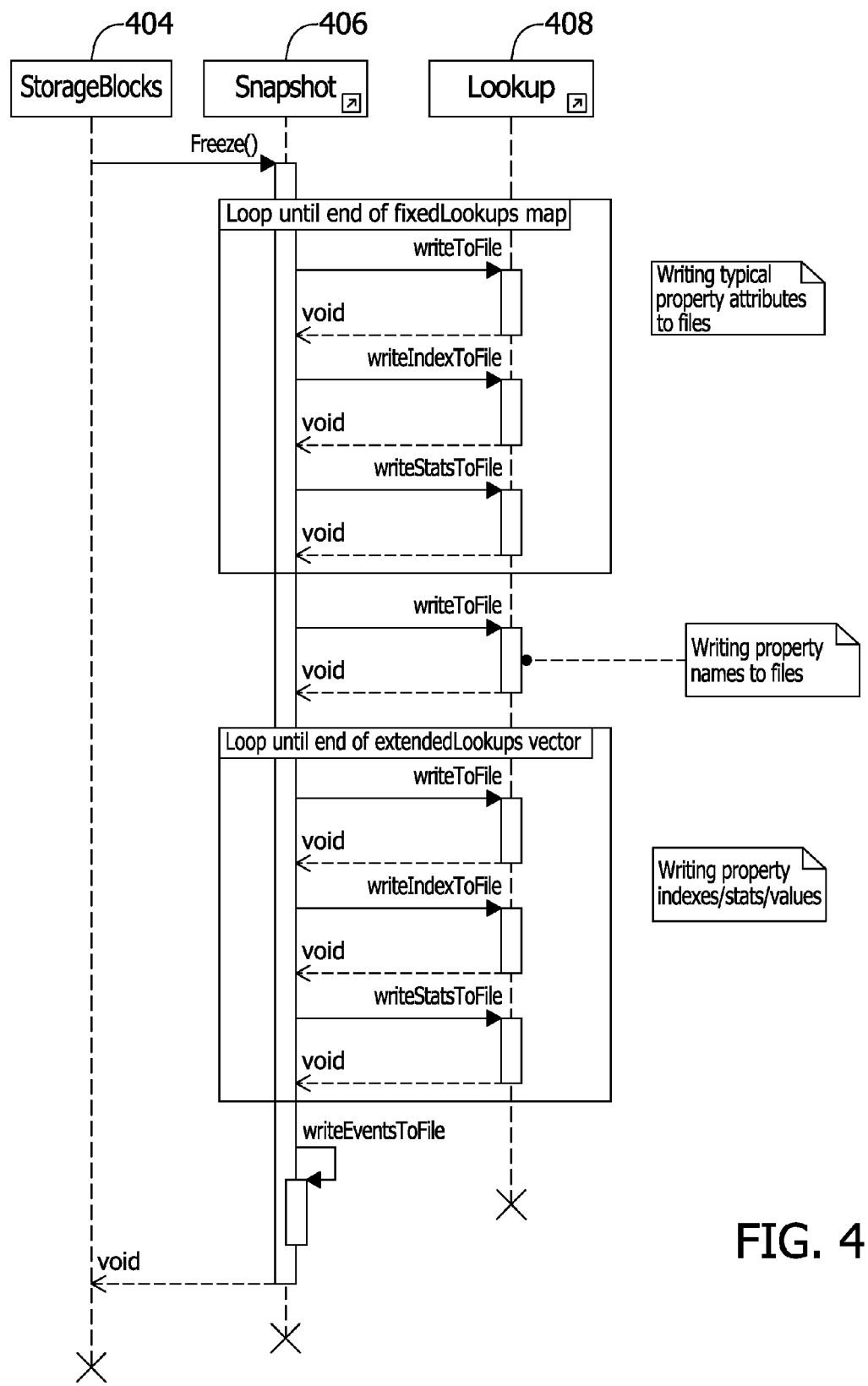
FIG. 4 is a diagram depicting the process of writing a frozen snapshot to disk.

FIG. 4 is a diagram describing the process of writing a frozen snapshot to disk. The "write to disk" command is issued by storage block 404 to snapshot 406. The snapshot 406 uses the lookup process 408 to access all of the mapping data that was created during the adding of events and freezing of the snapshot. The writing process loops through the event properties stored on snapshot 406, starting with the built-in properties. It records the property names and indices to the disk. It then loops through the extended properties and records them as well. Finally, the writing of the snapshot to disk is completed.

The event historian system maintains an index file set to enable fast and efficient lookup of events and event properties. The index file set comprises a plurality of data files and data index files that are populated as the event data is received and placed into a snapshot as described above. The data files and data index files are updated and stored as the data is merged in the merge process. Once the index file set has been built and stored, queries to the event historian make use of the data index files to look up desired event data efficiently.

The main data file of the index file set is events.dat. Events.dat comprises fixed length rows of event data records sorted by time. This file contains all the specific data that is received from data sources. Events.dat is closely related to the EventEncoding.dat, which is the CBE file discussed above. EventEncoding.dat contains the shared patterns of data in each of the fixed length event data records in event.dat and the locations of those shared patterns. Each of the shared patterns is removed from events.dat and stored once in EventEncoding.dat. As described above, the creating of EventEncoding.dat significantly compresses the total memory space occupied by the event data.

PropertyNames.dat is created from the received event data as a way of quickly determining the properties present in the event data. It is a simple file containing a line for each extended property containing the name of the property.

In addition to the data files, the index file set comprises several data index files that enable the event historian system to efficiently query the event data. Each of the data index files contains a data section for each individual event property. Each property section has a header that provides the property name, length of the property data type, and an offset indicating where the data appears in the event data row of events.dat. The data index files include lookup.dat, index.dat, stats.dat, and btreelookup.dat.

Lookup.dat comprises the header information described above and associated lookup data for each property value, including an offset indicating where the value begins. Stats.dat is related to lookup.dat in that it contains rows for each property value including the offset value of lookup.dat. The rows of stats.dat are in order of the property value and also contain the offset of the first occurrence of the associated index and the count of the number of times the value occurs in the snapshot. Index.dat maps the index of an event in events.dat to an index sorted by the composite key of property value, the time of the event occurrence, and the event id.

If a property has a large distinct value count, the data index files may also include an entry in btreelookup.dat. Btreelookup.dat contains a header for all properties, but if the property does not have a btree index, the offset and size in the header for the property data section will be set to zero. If a property does have a btree index, the header will point to a data section that contains a btree lookup index for that property. The btree lookup index points to leaf nodes which are contained within the stats and lookup files. The use of the btree index enables the system to narrow down searches from the order of 1 billion stats and indexes down to approximately 1000 stats and indexes. Once narrowed, the search is reverted to a binary lookup.

Table 3 is an exemplary events.dat:

TABLE 3

Example Events.dat

| Event Index (implied) | Event Time | Event GUID | "fruit" Property Value | Other properties |
|---|---|---|---|---|
| 1 | T1 | G1 | banana | ... |
| 2 | T1 | G2 | apple | ... |
| 3 | T2 | G3 | cherry | ... |
| 4 | T3 | G3 | cherry | ... |
| 5 | T4 | G4 | apple | ... |

Table 4 shows the lookup.dat corresponding to the events.dat. The index of the lookup.dat is assigned to the row in order and the rows are ordered by the specific property value. The offset shows where the property value begins in the data. Starting with a 0 offset, "apple" occupies offsets 0-4 (one for each letter), "banana" occupies offsets 5-10, and cherry occupies offsets 11 onward.

TABLE 4

Example Lookup.dat

| Index (implied) | Offset (implied) | Value |
|---|---|---|
| 1 | 0 | apple |
| 2 | 5 | banana |
| 3 | 11 | cherry |

Table 5 shows the stats.dat corresponding to the events.dat. The index of the stats.dat is assigned to the row in order and the rows are ordered in the same order as lookup.dat. Using lookup.dat, any property value that is of indeterminate length is converted into an offset value and index, enabling stats.dat to have fixed length rows. The data includes the offset from lookup.dat, an index of the first appearance of the value in a list sorted by property value (apple at values 1 and 2, banana at 3, and cherry at 4 and 5), and the total count of appearances of the property value in the snapshot.

TABLE 5

Example Stats.dat

| Index (implied) | Offset | Sorted Index (location of first appearance ordered by property value) | Count |
|---|---|---|---|
| 1 | 0 | 1 | 2 |
| 2 | 5 | 3 | 1 |
| 3 | 11 | 4 | 2 |

Table 6 shows the index.dat corresponding to the events.dat. The index of the stats.dat is assigned to the row in order and the rows are ordered according to the composite key of property value, the time of the event occurrence, and the event id. The first index is row 2 with a composite key of apple:T1:G2. The second index is row 5 with a composite key of apple:T4:G4. The remaining rows are ordered in the same manner. A column for the composite key has been included in Table 6 to demonstrate the ordering of the indices, but is not actually present in a real index.dat file.

TABLE 6

Example Index.dat

| Index (implied) | Event Index | Composite Key (not present in the actual file) |
|---|---|---|
| 1 | 2 | apple:T1:G2 |
| 2 | 5 | apple:T4:G4 |
| 3 | 1 | banana:T1:G1 |
| 4 | 3 | cherry:T2:G3 |
| 5 | 4 | cherry:T3:G3 |

Event Data Snapshot Merge Process

The event historian system uses a merge process to sort received event data in the background as the system runs. The received event data comes into the system and is quickly recorded in a plurality of snapshots, as described above. The snapshots may be overlapping and contain duplicate event data. The merge process is run iteratively across all of the snapshots in a storage block, sorting and merging smaller snapshots into larger sorted snapshots. Eventually, for a given storage block, the snapshots will be merged into a single sorted snapshot. The merge process also eliminates duplicate events as it merges the snapshots. The reception and storage of data into snapshots may still happen concurrently with the described merge process executing in the background.

The event historian system can execute the merge process in the background because snapshots are "frozen" after they have been populated. Because no new event data will ever be added to a frozen snapshot, the merge process does not have to consider whether additional data will be added to the snapshot after the merge is completed.

The merge process determines which snapshots of the available snapshots to merge according to several variables. In an embodiment, the merge process will only be executed with frozen snapshots and it can be used to merge two or more snapshots. The merge process has a setting that determines the maximum number of snapshots it will attempt to merge known as the MaxNumberOfSnapshotsForMerge value. The default value of this setting may be ten snapshots, but it is possible to set it to more or less as necessary. The merge process runs at regular intervals that may also be set according to the system needs. The default time period for running the merge process may be five minutes.

Each time the merge is scheduled, it starts by evaluating the most recent storage block and then moves back in time to older storage blocks until it either finds a set of snapshots that meet the merge selection criteria, or evaluates all storage blocks. Once a set of snapshots are selected for merge, they are merged and then the merge process may complete without evaluating any more storage blocks. The merge process may favor performing merge operations on the most recent storage blocks, which is where new snapshots are expected to be arriving.

There are two values that are used in determining snapshots to merge. DelayForMergingInMinutes is a value that represents the minimum amount of time since a snapshot has been added to a storage block to allow for a final merge process to be executed on that storage block. A default value may be 30 hours. This value indicates when the storage block is expected to have received all of the event data for the associated time interval. If a merge operation occurs within this timeframe, it will not be a final merge process. In that event, only snapshots of containing similar amounts of event data will be merged with one another. This encourages efficient merging, as it is more costly to merge snapshots of widely varying sizes with each other.

To determine snapshots of similar sizes, they are sorted into buckets according to the MergeBucketCountBase value. The default of the MergeBucketCountBase value may be 100,000 events, but this is a changeable value as necessary. The snapshot buckets are divided according to this value. The lowest bucket is any snapshot from 1 event up to the MergeBucketCountBase value. The second bucket is from the MergeBucketCountBase value to MergeBucketCountBase * 10 events. Each of the next buckets contains snapshots with event counts from the maximum of the previous bucket up to ten times that value. Once sorted in this way, the merge process will merge any groups of snapshots in a bucket containing more snapshots than the MaxNumberOfSnapshotsForMerge value. For instance, if the MaxNumberOfSnapshotsForMerge value is 10 and a bucket contains 13 snapshots, the merge process will merge 10 of those snapshots. If a bucket contains 9 snapshots, those snapshots will not be merged until an additional snapshot has arrived or a final merge process is being performed.

For storage blocks that have not received any new events for a timespan of at least DelayForMergingInMinutes, the merge process will perform the final merge. This will result in a single snapshot containing all of the events within the storage block. The merge process sorts the snapshots by size and sends them to be merged in groups no larger than MaxNumberOfSnapshotsForMerge. However, the merge process will not sort the snapshots into separate buckets, nor will a minimum number of snapshots be required to be merged. The merge process in this embodiment will continue selecting up to MaxNumberOfSnapshotsForMerge snapshots and merging them until the storage block contains only one merged snapshot.

Figure 5:
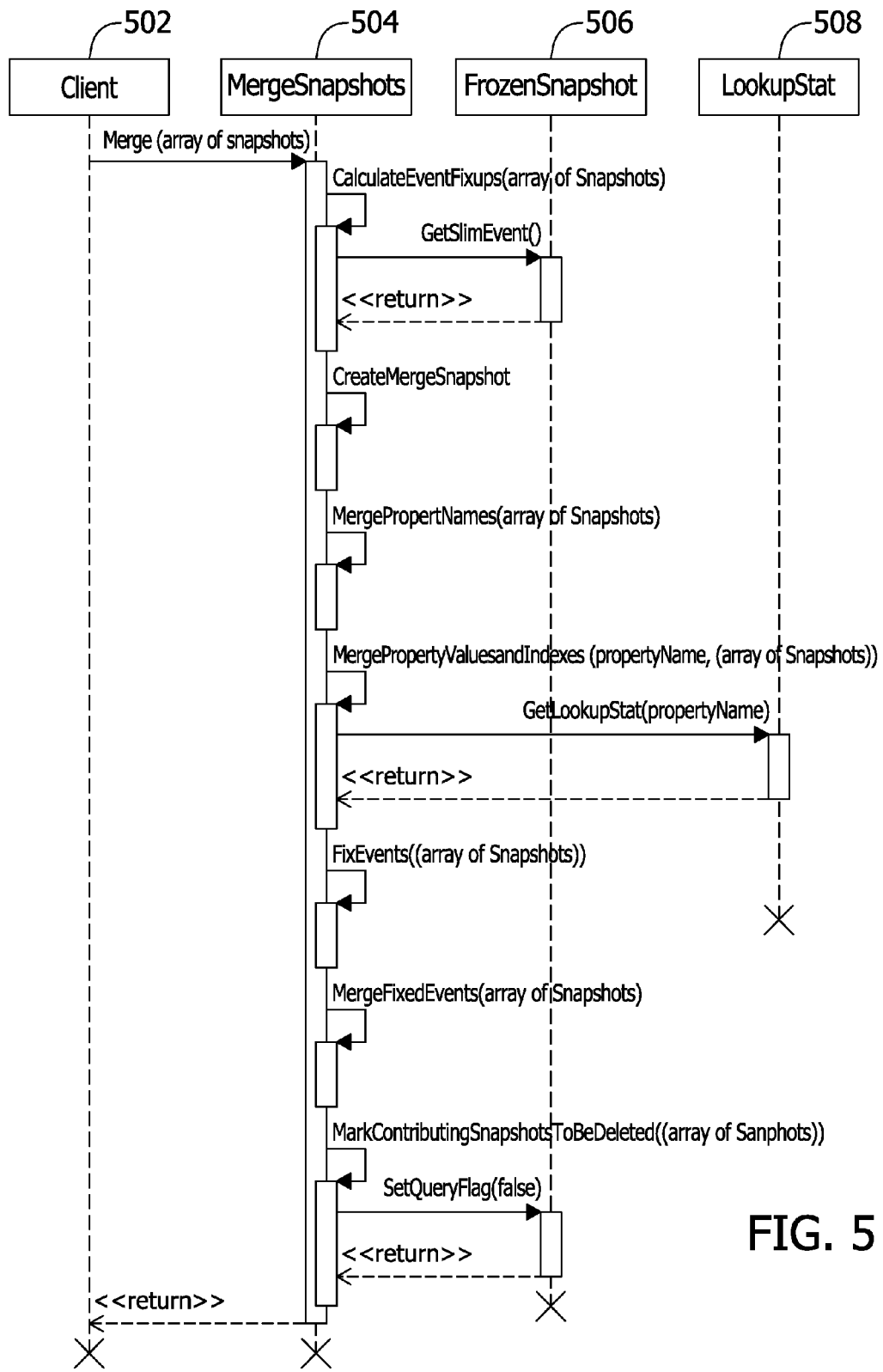
FIG. 5 is a diagram depicting the process of merging multiple snapshots together.

FIG. 5 is a flow diagram describing the steps that are taken during the merge process. Once the group of snapshots to be merged is determined by the client 502, the merge process 504 begins by calculating the event index fixes necessary to merge all of the events together (CalculateEventFixups). During this stage, events stored in the events.dat of each frozen snapshot 506 are sorted into order with each other based on time, and new indexes are assigned to each event in the merged snapshots according to this order. The changes to the indexes are stored in a temporary file known as event_fixup.dat.

The merge process gathers all of the property names from the PropertyNames.dat file in each snapshot and forms a merged PropertyNames.dat file for the merged snapshot which contains all of the property names in order.

The merge process cycles through each of the properties of the merged PropertyNames.dat to merge the property data from each contributing snapshot (MergePropertyValuesAndIndexes). Each of the data index files in the snapshot index file sets is sorted to form merged index file sets for each of the properties. During this step, a LookupStat process 508 may execute for each property in order to return a current location of the property value. A fixup_<property>.dat file is created for each property of each contributing snapshot containing the changes made to index file set of the property during the merge. Then, for each property of a snapshot, event_fixup.dat is used to update the event indexes as reflected in the data indexes of the snapshot properties. These changes may be stored in a temporary file known as index_fixed_<property name>.dat for each property.

Upon completion of the index fixes necessary for the events and properties in the group of snapshots, the merge process creates a new EventEncoding.dat that reflects the shared patterns for the event data records of the group of snapshots (FixEvents). The fixed event data records are encoded according to the new EventEncoding.dat and written to a temporary file known as events_fixed.dat. Once all the event data has been encoded, the events stored in events_fixed.dat are merged together and sorted by time and id to form a new events.dat for the final merged snapshot (MergeFixedEvents). Duplicate event data entries are eliminated from the final merged snapshot. As a result, the merged snapshot contains a properly updated events.dat, EventEncoding.dat, and index files for each property present in the merged snapshot.

The merge process finally marks the contributing snapshots to be deleted and indicates that they are not to be used for queries.

Historian Query Interface

The event historian system enables a client system to query the event data stored in the storage blocks. The Query Interface uses a variety of features to ensure fast and efficient query response and accurate results. Retrieval of event data functions by initially assigning a query a Query ID, which is then used to identify the query until it is complete. A query may be made up of a plurality of input parameters include a start time, end time, number of events, event order, and any additional filters. The start time and end time indicate the timeframe of the desired event data. The "number of events" parameter is an optional parameter that can be used to determine how many events are returned for each "chunk" of returned event data. In the case that a query returns a very large amount of results, the number of events can be set such that the results arrive in manageable groups. The event order parameter determines whether the results are returned in ascending or descending order, based on the event time and the event ID. The filters can be a variety of limitations that further focus the results of the query.

Upon starting a query, the Query ID is returned. The Query ID can then be used to call a "GetEvents" function, which will result in retrieving all or a group of the results of the query. In the event that all of the query results cannot be returned at once, whether it is because there are too many results, or because the number of events returned is limited by input parameter, a "ContinueQuery" function may be called to retrieve the next set of results. Once all the results have been retrieved, an "EndQuery" function may be executed, releasing all the resources occupied by the query based on Query ID.

When the event historian receives a query that requests data from a particular storage block and snapshot, the entire snapshot is not loaded into memory. Rather, the data index files are used to determine a set of events to be returned and, in this embodiment, only that set of events is retrieved and loaded into memory. This greatly increases the efficiency of event retrieval by limiting the memory writes to the data that is necessary to respond to the query.

The event historian system may be queried using the Open Data Protocol. The Open Data Protocol (OData) is a Web protocol for querying and updating data that provides a way to unlock data and free it from silos that exist in applications today. OData is being used to expose and access information from a variety of sources including, but not limited to, relational databases, file systems, content management systems and traditional Web sites. An OData request is formatted as a Hyper Text Transfer Protocol (HTTP) request sent to the event historian system and contains several parts. A protocol (http or https), a host (a site URL), the Historian service name, the path of the requested "events" resources, and any optional parameters such as filters. For example: http://localhost:32569/Historian/v1/Events. OData also functions with the Representational State Transfer (REST) protocol. For example, to retrieve the first set of event data for a certain range of time, the following query may be used: http://localhost:32569/Historian//v1/Events?$top=<count>&$filter=EventTime gt datetime'<StartTime>' and EventTime lt datetime'<EndTime>'. The <count>value determines how many events are returned and the StartTime and EndTime values are compared against the EventTime values for the events to ensure that the results are greater than (gt) the StartTime and less than (lt) the EndTime.

The OData Output format follows a concise encoding, which is customized to display the data in name and value pairs, as shown in the below example. If the resource is "$metadata", the server returns the Service Metadata Document that exposes the data model of the service in XML and JSON. This document is the global (static) metadata that cannot contain content specific information. Instance specific metadata is available on a collection or entity: in this case the resource URI needs to end with the "/$metadata" segment. For example:

```
http://sripraneeth02/Historian/v1/$metadata
{
"odata.metadata":"http://localhost:32569/Historian/v1/$metadata#EventProperties","value":[
    {
"PropertyName":"Area","DisplayName":"Area","Description":"Area Description","DataType":"String"
    },{
        "PropertyName":"DisplayText","DisplayName":"DisplayText","Description":"DisplayText description","DataType":"String"
    },{
        "PropertyName":"EventTime","DisplayName":"EventTime","Description":"EventTime description","DataType":"Time"
    },{
        "PropertyName":"EventType","DisplayName":"EventType","Description":"EventType Description","DataType":"String"
    },{
"PropertyName":"Id","DisplayName":"Id","Description":"Id Description","DataType":"String"
    },{
        "PropertyName":"IsAlarm","DisplayName":"IsAlarm","Description":"IsAlarm description","DataType":"Boolean"
    },{
```

-continued

```
   "PropertyName":"Priority","DisplayName":"Priority","Description":"Priority
description","DataType":"Numeric"
     },{
       "PropertyName":"Severity","DisplayName":"Severity","Description":"Severity
Description","DataType":"Numeric"
     },{
"PropertyName":"Source","DisplayName":"Source","Description":"Source
description","DataType":"String"
     },{
"PropertyName":"System","DisplayName":"System","Description":"System
description","DataType":"String"
     }
   ]
}
```

The above query may return event data in the following form:

```
{
   "odata.metadata":"http://localhost:32569/Historian/v1/
   $metadata#Events","value":[
     {
       "Area":"WinPlatform_001","DisplayText":"AppEngine_001
started successfully.","EventTime":"2014-05-
19T15:37:35.223+01:00","EventType":"SYS",
"Id":"53fdfed2-6023-404c-a997-
1c421ef64239","IsAlarm":false,"Priority":999,"Severity":0,
"Source":"AppEngine_001","System":"NewGal"
     },{
       "Area":"AppEngine_001","DisplayText":"Write success -
The AppEngine hosts and schedules execution of Application
Objects, Areas, and Device Integration Objects.",
"EventTime":"2014-05-19T15:37:39.636+01:00","EventType":"OPR",
"Id":"1c325149-0931-460c-ae4f-3dd04fda3414","IsAlarm":false,
"Priority":999,"Severity":0,"Source":"AppEngine_001.ScanStateCmd",
"System":"NewGal"
     }
```

Data retrieved through OData and the REST Service including flexible extended properties will be in the following format. Data Types in the extended properties of the event will be preserved. In the output below, the flexible properties can be seen in the "Properties" section. Each property then has a three value row, including the name of the extended property, the value of the extended property, and the data type of the extended property.

A query may or may not contain a filter. lithe query does not contain any specific filters, corresponding storage blocks and snapshots will be selected to read the events and return them back to the client system based on the start time and end time. While returning the events, events will be processed and stored in the resultant data set based on the event order specified in the query parameters. If filters are specified in the query request, after selection of corresponding storage blocks and snapshots, filters will be applied on each snapshot in the selected list and the event indexes will be retrieved, which will further be used to read the filtered events and return them in the event order.

The event historian system supports a wide variety of operators for filtering query results. Table 7 shows an exemplary list of operators that may be used in a query:

TABLE 7

| Filter Operators | |
|---|---|
| Operator | Description |
| Eq | Equal |
| Ne | Not equal |
| Gt | Greater than |
| Ge | Greater than or equal |
| Lt | Less than |
| Le | Less than or equal |
| NEq | Equal |
| NGt | Greater than |
| NGe | Greater than or equal |

```
"odata.metadata":"http://sripraneethn02:32569/Historian/$metadata#Events","value":[
     {
       "Area":"Area_23","DisplayText":"\u6a31\u6843-18","EventTime":"2013-10-
21T10:39:31.606-07:00","EventType":"EventType_0","Id":"61fb15a0-dcc6-4a84-9926-
b323935d01f1","Priority":100,"Properties":[
          {
            "Name":"boolfalse","Value":"True","Type":"Boolean"
          },{
            "Name":"booltrue","Value":"True","Type":"Boolean"
          },{
            "Name":"boolvalue","Value":"True","Type":"Boolean"
          },{
            "Name":"floatvalue","Value":"30","Type":"Float"
          },{
            "Name":"longvalue","Value":"-128","Type":"Long"
          },{
            "Name":"ulongvalue","Value":"1","Type":"UnsignedLong"
          }
       ],"ReceivedTime":"2013-10-21T10:39:31.606-
07:00","Source":"Source_20","System":"System_-
8","IsAlarm":true,"Severity":2,"IsSilenced":false
     },
```

TABLE 7-continued

Filter Operators

| Operator | Description |
|---|---|
| NLt | Less than |
| NLe | Less than or equal |
| Begins | String begins with(Application only to Strings) |
| EndWith | String Ends with (Application only to Strings) |
| Contains | If string contains (Application only to Strings) |
| Not Begins | If string does not begin with (Application only to Strings) |
| Not Endswith | If string does not end with (Application only to Strings) |
| Not Contains | If string does not contain (Application only to Strings) |

While retrieving the data, the system is able to retrieve the values without knowing the data type that was used to store the property. For instance, if the query requires that a certain property be equal to an integer "20", the query interface will search not just for integers equal to "20", but also doubles, longs, shorts, or even strings that say "20". Because the system allows for flexible data types when recording the event data initially, it is capable of returning data with flexible data types without the query requesting it. This ensures accurate and complete results are returned.

Filtering of property values by the event historian system may be done by binary search to ensure quick and efficient access to the desired results among large quantities of event data. The index file set for some properties includes a btree index for efficient searching as well, as described above.

between the filters: $filter=Area eq 'Area_001' and Priority eq 10. 'And' and 'or' can be combined as well, like so: $filter=Area eq 'Area_001' and Priority eq 10 or SeverityCode gt 2.

The event historian system is also compatible with the use of two level nested filters. For instance, a query may require several filters to be combined with 'and' while those results are required to be combined with 'or': ((pName1 eq pValue1) AND (pName2 eq pValue2)) OR ((pName3 eq pValue3) AND (pName4 eq pValue4)). Other combinations of 'and', 'or', and nested filters may also be used.

Queries can be continued if there are additional results to receive. The query interface of the event historian system enables the use of the same query and filter multiple times to retrieve the next set of data. If an OData link is used to start a query at a certain start time, and the results retrieved in the first set of results data do not completely satisfy the query, the same OData link can be used a second time. The second set of results data will start where the previous set of results data left off. In the example below, the first OData link returns the result shown immediately below it. At the end of the result is a copy of the initial OData link. Invoking that link again will result in the return of additional results taking place after the first set of results:

```
http://sripraneethn02:32569/Historian/v1/Events
{
  "odata.metadata":"http://sripraneethn02:32569/Historian/$metadata#Events","value":[
    {
      "Area":"Area_23","DisplayText":"\u6a31\u6843-18","EventTime":"2013-10-21T10:39:31.606-07:00","EventType":"EventType_0","Id":"61fb15a0-dcc6-4a84-9926-b323935d01f1","Priority":100,"Properties":[
        {
          "Name":"boolfalse","Value":"True","Type":"Boolean"
        },{
          "Name":"booltrue","Value":"True","Type":"Boolean"
        },{
          "Name":"boolvalue","Value":"True","Type":"Boolean"
        },{
          "Name":"floatvalue","Value":"30","Type":"Float"
        },{
          "Name":"longvalue","Value":"-128","Type":"Long"
        },{
          "Name":"ulongvalue","Value":"1","Type":"UnsignedLong"
        }
      ],"ReceivedTime":"2013-10-21T10:39:31.606-07:00","Source":"Source_20","System":"System_-8","IsAlarm":true,"Seventy":2,"IsSilenced":false
    },
    http://sripraneethn02:32569/Historian/v1/Events
```

Multiple filters may be used and grouping symbols can be used to control for order of operations. Arrays of filter values will be considered to be combined using an 'or' operator. For instance, Priority eq {100, 200, 500, 700} is equivalent to (Priorty eq 100 or Priorty eq 200 or Priorty eq 500 or Priorty eq 700). If an 'and' is desired, then 'and' must be included In an embodiment, the event historian query interface may use a skip token within the query results to enable access to additional results. The skip token will be inserted into the "next page" query provided with the results to notify the query interface of where the previous results left off when called. See the example below:

```
"odata.metadata":"http://sripraneethn02:32569/Historian/$metadata#Events","value":[
  {
    "Area":"Area_23","DisplayText":"\u6a31\u6843-18","EventTime":"2013-10-21T10 :39:31.606-07:00","EventType":"EventType_0","Id":"61fb15a0-dcc6-4a84-9926-b323935d01f1","Priority":100,"Properties":[
      {
        "Name":"boolfalse","Value":"True","Type":"Boolean"
      },{
        "Name":"booltrue","Value":"True","Type":"Boolean"
```

-continued

```
    },{
        "Name":"boolvalue","Value":"True","Type":"Boolean"
    },{
        "Name":"floatvalue","Value":"30","Type":"Float"
    },{
        "Name":"longvalue","Value":"-128","Type":"Long"
    },{
        "Name":"ulongvalue","Value":"1","Type":"UnsignedLong"
    }
    ],"ReceivedTime":"2013-10-21T10:39:31.606-
07:00","Source":"Source_20","System":"System_-
8","IsAlarm":true,"Seventy":2,"IsSilenced":false
    }
    ] "odata.nextLink":"http://localhost:32569/Historian/Events?$skiptoken='2014-04-
28T15:49:52.041%7Cc715e27e-ade5-4d01-aa64-1e1b36c324b5'"
}
```

Figure 6:
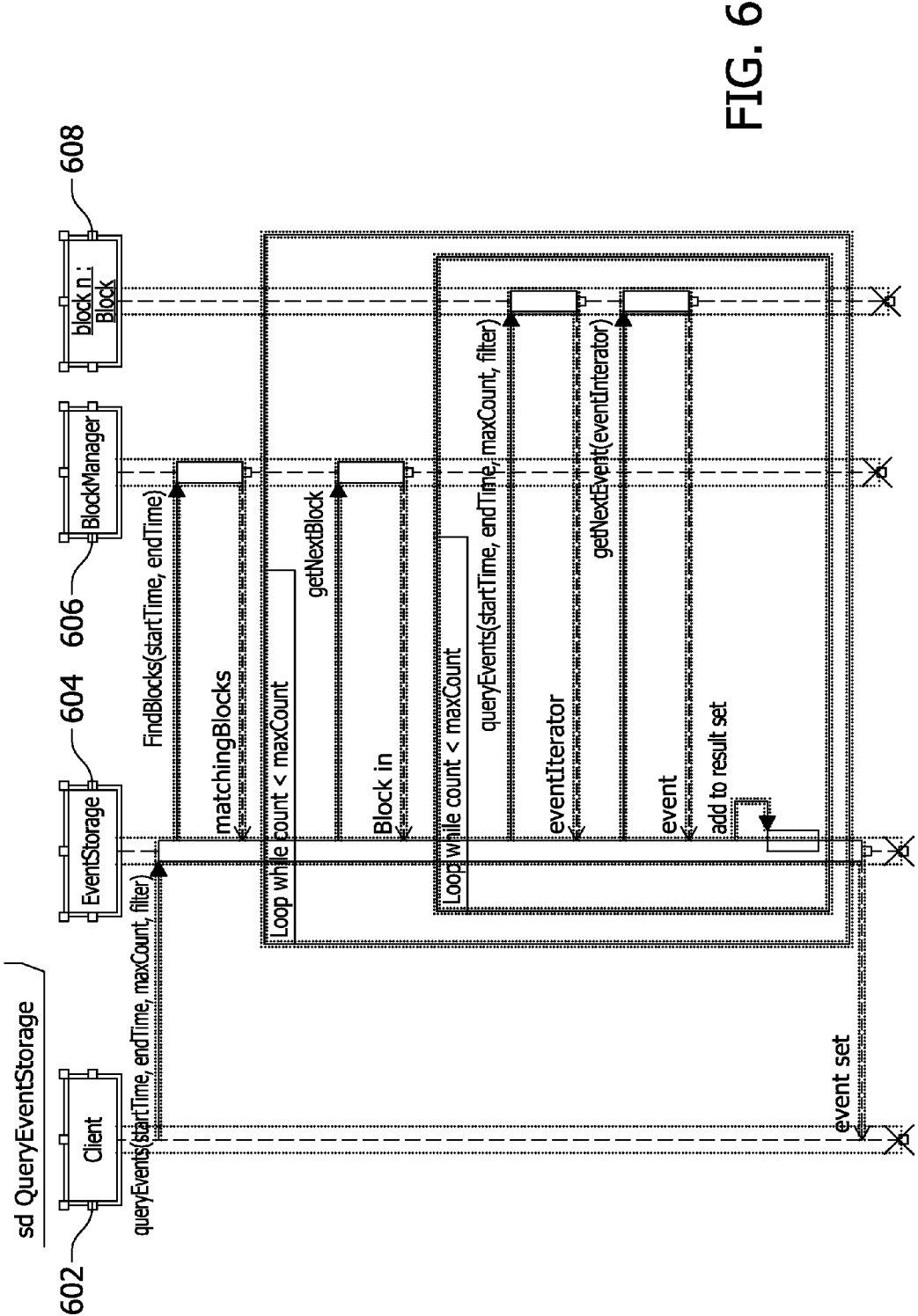
FIG. 6 is a diagram depicting the process of the event historian system responding to a query from a client system.

FIG. 6 is a diagram describing the process of querying events using the query interface of the event historian system. The client system 602 sends a query to the event historian system 604 containing the query parameters as described above, including a start time, end time, maximum result count, and any additional filters. From the query parameters, the event historian system 604 determines the queried time range and finds the storage blocks that contain the event data from that time range using the Block Manager 606. The event historian system 604 loops through each matching storage block 608 to retrieve event data from the snapshots therein. Based on the filter parameters, event data is retrieved from the storage blocks 608 that satisfy all of the filter limitations. Each result is added to a result set. In determining the event data results, the applied filters are analyzed and applied in the most efficient way based on which properties are being filtered. If a property is particularly unique, it may be applied first in order to narrow down the possibilities as much as possible initially. Once all of the event data has been filtered and all results have been added to the result event set, the event set is returned to the client system 602.

Data Dictionary

The event historian system may maintain a Data Dictionary to provide information regarding what data values are available for querying through the Historian Query Interface described above. The Data Dictionary comprises a file or files that store a schema of the available data values that may be queried. The system may include a default list of data values that are stored in the system and present in the Data Dictionary schema. The default data list may include values like an event ID, event priority, event severity, event type, event time, an "IsAlarm" value, and a comment that may be included. Table 8 below shows an exemplary list of possible default event data values.

TABLE 8

Event Data Values

| Property Name | Data Type | Description | Examples/ Allowed Values |
| --- | --- | --- | --- |
| ID | GUID | Unique Identifier for the event | |
| Priority | Int32 | Number indicating the importance of the event | 1 to 999. 1 is highest priority, 999 is lowest. |
| Severity | Int32 | Urgency Categorization of | 1 to 4 |

TABLE 8-continued

Event Data Values

| Property Name | Data Type | Description | Examples/ Allowed Values |
| --- | --- | --- | --- |
| Type | String | String describing the type of event | Alarms or Events 1 - Critical 2 - High 3 - Medium 4 - Low Alarm.Set Alarm.Clear Alarm.Acknowledged Alarm.Silenced.Set Alarm.Silenced.Clear Alarm.Suppressed.Set Alarm.Suppressed.Clear Alarm.Disabled.Set Alarm.Disabled.Clear User.Write User.Write.Secured User.Write.Verified System.Deploy System.Undeploy Engine.Start Engine.Stop Engine.OnScan Engine.OffScan Engine.Active Engine.Standby Engine.Terminated |
| EventTime | DateTime | The UTC time stamp at which the event occurred | |
| ReceivedTime | DateTime | The UTC time stamp at which the current system component received the message | |
| IsAlarm | Bool | Identifies the message as an alarm type message | True/False |
| Comment | String | Stores additional comments or descriptions for the event | |

Additionally, the default data list may also include data describing a provider, a user, a data source, or specific alarm data. Table 9 shows an exemplary list of provider data values that may be included in the Data Dictionary.

TABLE 9

Provider Data Values

| Property Name | Data Type | Description | Examples/ Allowed Values |
|---|---|---|---|
| Provider_NodeName | String | Fully qualified DNS name. If that is not available then it can be NETBIOS machine name. If that is not available, it can be the IP address. If that is not available it can be the MAC address. | AOS-N-01.dev.wonderware.com AOS-N-01 10.2.18.23 23-45-67-89-AB-CD-EF |
| Provider_System | String | Software system that generated the event. | Application Server InTouch InBatch |
| Provider_ApplicationName | String | Application name. For Application Server, this will be the galaxy name. For InTouch, it will be the InTouch application name. | "Demo Application 1024 X 768" "Galaxy1" Galaxy_Loading Batch_Server |
| Provider_SystemVersion | String | Software version string for Provider.System. This string should contain all path levels. In general, this will match exactly the version number as displayed in the applications "Help/About" dialog. | "4.0.05000 4330.0124.388.1" "11.0.05000 2129.0798.0065.0007" |
| Provider_InstanceName | String | Provider specific string that uniquely identifies the instance on a given node name for the given application. For InTouch - this will be: Terminal server Session ID For Application Server - this will be: Engine tagname. | "Engine_001" |

Table 10 shows an exemplary list of user data values that may be included in the Data Dictionary.

TABLE 10

User Data Values

| Property Name | Data Type | Description | Examples/ Allowed Values |
|---|---|---|---|
| User_Account | String | This is the login name for the operator for the given application. | corp\johnd john.doe@company.com johnd |
| User_Name | String | Complete first name + Last name | John Doe |
| User_NodeName | String | Computer name from which User | Johnd01.dev.wonderware.com |

TABLE 10-continued

| | | User Data Values | |
|---|---|---|---|
| Property Name | Data Type | Description | Examples/ Allowed Values |
| | | executed action. (See Provider.NodeName for format) | |
| User_Email | String | User email address | john.doe@company.com |
| User_Phone | String | User Phone Number | 1-800-555-1212 |
| User_InstanceName | String | Based on Provider_InstanceName | |
| User_Agent | String | Application name user was running. | InTouch ObjectViewer Wonderware Information Server Mozilla Firefox Chrome Internet Explorer |

Table 11 shows an exemplary list of data source data values that may be included in the Data Dictionary.

TABLE 11

| | | Source Data Values | |
|---|---|---|---|
| Property Name | Data Type | Description | Examples/ Allowed Values |
| Source_ProcessVariable | String | Related process variable. For example, if "TI101" has a field attribute "PV" and this is a "Hi" alarm, this is TI101.PV". In a User.Write or similar event, this is the attribute being written to. | "TIC101.PV" |
| Source_Units | String | Engineering units used for process variable. | Feet Pounds N/m^2 |
| Source_ConditionVariable | String | Related condition variable. For example, if "TI101" has a field attribute "PV" and this is a "Hi" alarm, this is TI101.PV.Hi" | "TIC101.PV.Hi" |
| Source_Object | String | Non-hierarchical name of source object. | "TIC101" |
| Source_HierarchicalObject | String | Hierarchical name of source object. | "Reactor_001.TIC" |
| Source_Area | String | Non-hierarchical area name. | "Area_001" |
| Source_HierarchicalArea | String | Hierarchical area name. | "Plant_001.Building_002.Mixing" |
| Source_Engine | String | Non-hierarchical engine name. | "AppEngine_001" |
| Source_Platform | String | Non-hierarchical platform name. | "WinPlatform_001" |

Table 12 shows an exemplary list of alarm data values that may be included in the Data Dictionary.

TABLE 12

Alarm Data Values

| Property Name | Data Type | Description | Examples/Allowed Values |
|---|---|---|---|
| Alarm_ID | GUID | Unique identifier for an instance of an alarm. | |
| Alarm_Class | String | alarm class | |
| Alarm_Type | String | alarm type | |
| Alarm_InAlarm | Boolean | The state of the alarm after the transition. | True/False |
| Alarm_State | String | State of Alarms | UNACK_ALM UNACK_RTN ACK_ALM ACK_RTN |
| Alarm_TagType | String | Types of tags associated to alarm | S I F |
| Alarm_Aknowledged | Boolean | The state of the alarm after the transition. | True/False |
| Alarm_Condition | String | The condition being alarmed. It should be one of the given, pre-defined values from the examples if appropriate. | Limit.HiHi Limit.Hi Limit.Lo Limit.LoLo ROC.Hi ROC.Lo System Discrete.True Discrete.False Deviation.Minor Deviation.Major SPC Batch Process Software System 120 |
| Alarm_LimitString | String | Limit being alarmed | |
| Alarm_UnAckDurationMs | Int32 | Time between alarm being raised and acknowledged | |
| Alarm_DurationMs | Int32 | | |
| Alarm_IsSilenced | Boolean | True if alarm is silenced, false otherwise | |
| Alarm_IsShelved | Boolean | True if alarm has been shelved, false otherwise | |
| Alarm_ShelveStartTime | Date Time | Scheduled start of shelve time if shelved | |
| Alarm_ShelveEndTime | Date Time | Scheduled end of a shelve time if shelved | |
| Alarm_ShelveReason | String | Reason for shelving of the alarm | |
| Alarm_OriginationTime | Date Time | Gives origination time of initial alarm condition | |

In addition to the default set of data values that are available through the schemas described in the Data Dictionary, custom properties may also be added to the system and later accessed. The schema stored in the Data Dictionary may be updated to include schemas representing custom properties that are added. Once added to the Data Dictionary schema, a future user may make an initial request to the system to obtain the Data Dictionary schema and then be notified of the availability of the custom properties along with the default properties. The schema will also provide information regarding what type of data a data value is and the order in which to expect the retrieved data to arrive. Any type of data may be stored as a custom property. A custom property may be represented by a simple data value or it may comprise an additional complex schema within the Data Dictionary that may include more than one level of data or lists of different data values. A simple example of custom properties in a query result is shown below:

```
"odata.metadata":"http://sripraneethn02:32569/Historian/$metadata#Events","value":[
    {
        "Area":"Area_23","DisplayText":"\u6a31\u6843-18","EventTime":"2013-10-21T10:39:31.606-07:00","EventType":"EventType_0","Id":"61fb15a0-dcc6-4a84-9926-b323935d01f1","Priority":100,"Properties":[
            {
                "Name":"boolfalse","Value":"True","Type":"Boolean"
            },{
                "Name":"booltrue","Value":"True","Type":"Boolean"
            },{
                "Name":"boolvalue","Value":"True","Type":"Boolean"
            },{
                "Name":"floatvalue","Value":"30","Type":"Float"
            },{
                "Name":"longvalue","Value":"-128","Type":"Long"
            },{
                "Name":"ulongvalue","Value":"1","Type":"UnsignedLong"
            }
        ], "ReceivedTime":"2013-10-21T10:39:31.606-07:00","Source":"Source_20","System":"System_-8","IsAlarm":true,"Severity":2,"IsSilenced":false
    }
```

The query result contains several different default data values but it also contains a data structure called "Properties", which is followed by a set of data values. Each data value in the set is represented by a name of the property, the value of the property, and the data type of the property. Each of these properties is a custom property that has been included in the Data Dictionary schema. The Data Dictionary schema may also include additional layers of data, such that a given custom property may be represented by a list of other data values or references.

The Data Dictionary enables the event historian system to be flexible and dynamic in how the data is stored and organized. If the organization of data is altered, so long as the Data Dictionary schema is altered to match the organizational change, a user querying the system would be notified of the new data structure and be able to interpret the results that are provided. The Data Dictionary enables a customer to customize the organization of data values that are stored and provided in response to queries. A customer can include data values that they need but are not present in the defaults or they may eliminate data values from the schema that they do not need.

A query may be received that requests values or properties which are not currently present in the Data Dictionary schema. The system may then update the Data Dictionary schema so that it contains the requested values or properties. Also, events may be received that have additional properties which are not accounted for in the Data Dictionary schema, and therefore not retrievable. The system may update the Data Dictionary schema so that it contains the properties of the newly received events.

Backend Storage View

The event historian system may provide a tool for use by a user that enables the user to monitor the storage blocks and functionality of the event historian. The Storage View tool enables a user to observe incoming event data, the merging of snapshots in a storage block, and responses to queries. This information may be conveyed to a user in the form of text or as a graphical user interface (GUI). A GUI may have a variety of icons indicating different event data, storage blocks, or snapshots. The GUI may provide information as to which storage blocks contain snapshots to be merged or which snapshots are being merged. The Storage View may display the process of responding to a query through the query interface, including determining storage blocks that fit the query parameters and determining which events satisfy the filter limitations. The Storage View tool may be available for access on a computer system running the event historian system or it may be accessible by a separate computer system which is communicatively coupled to the event historian system.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. An event historian system comprising:
    a processor; and
    a random access memory storage device coupled to the processor, said random access memory storage device storing event storage blocks containing snapshots and processor-executable instructions for merging snapshots in the event storage blocks, said processor-executable instructions comprising instructions for:
        determining that a storage block contains a plurality of snapshots to be merged, wherein the storage block stores event data gathered from a process control system over a period of time as an event data set, and wherein each snapshot independently covers a part of the event data set;
        combining event data of each of the plurality of snapshots by merging property data from each snapshot;
        combining index files of each of the plurality of snapshots into an index file set by sorting data index files thereof for each property;
        recording the combined event data in a sorted order as new event data in a new snapshot;
        assigning each index file to the combined event data in the sorted order;
        recording the assigned index files in the new snapshot;
        deleting the plurality of snapshots after merging into the new snapshot; and
        writing the combined event data comprising the new snapshot to a permanent memory storage device at one time.

2. The system of claim 1, wherein the system initiates a merge process at the beginning of a first time interval.

3. The system of claim 1, said determining that a storage block contains a plurality of snapshots to be merged further comprises determining that the plurality of snapshots to be merged are of similar sizes.

4. The system of claim 3, the processor executable instructions further comprising instructions for sorting the snapshots into snapshot groups, each snapshot group comprising snapshots which are of similar sizes.

5. The system of claim 4, wherein the snapshot groups comprise a first and a second snapshot group, said first snapshot group containing snapshots between zero events and a first number of events and said second snapshot group containing snapshots between the first number of events and a second number of events, wherein the second number of events is ten times the first number of events.

6. The system of claim 1, said determining that a storage block contains a plurality of snapshots to be merged further comprises determining that the storage block has not received event data for a first time interval.

7. The system of claim 6, wherein a final merge process is executed on the storage block in response to the storage block not receiving event data for a first time interval, the final merge process comprising the repeated merging of snapshots in the storage block until only one snapshot remains.

8. The system of claim 1, said determining that a storage block contains a plurality of snapshots to be merged further comprises determining that the plurality of snapshots to be merged are frozen.

9. The system of claim 1, said determining that a storage block contains a plurality of snapshots to be merged further comprises evaluating the most recent snapshots for merging before older snapshots.

10. The system of claim 1, the processor executable instructions further comprising instructions for eliminating duplicate event data from the combined event data in the new snapshot.

11. A method of merging snapshots of event data in an event historian system comprising:
    determining, by the event historian system, that a storage block stored on a random access memory storage device contains a plurality of snapshots to be merged, the storage block storing event data gathered from a process control system over a period of time as an event data set, each snapshot independently covering a part of the event data set of the storage block;
    combining, by the event historian system, event data of each of the plurality of snapshots into an index file set, the index file set including merged property data from each snapshot;
    combining, by the event historian system, index files of each of the plurality of snapshots, the combined index files of the snapshots including sorted data index files for each property;
    recording, by the event historian system, the combined event data in a sorted order as new event data in a new snapshot on the memory storage device;

assigning, by the event historian system, the index files to the combined event data in the sorted order;

recording, by the event historian system, the assigned index files in the new snapshot;

deleting, by the event historian system, the plurality of snapshots after merging into the new snapshot; and writing, by the event historian system, the combined event data comprising the new snapshot to a permanent memory storage device at one time.

12. The method of claim 11, wherein the event historian system initiates a merge process at the beginning of a first time interval.

13. The method of claim 11, said determining that a storage block contains a plurality of snapshots to be merged further comprises determining that the plurality of snapshots to be merged are of similar sizes.

14. The method of claim 13, further comprising sorting the snapshots into snapshot groups, each snapshot group comprising snapshots which are of similar sizes.

15. The method of claim 14, wherein the snapshot groups comprise a first and a second snapshot group, said first snapshot group containing snapshots between zero events and a first number of events and said second snapshot group containing snapshots between the first number of events and a second number of events, wherein the second number of events is ten times the first number of events.

16. The method of claim 11, said determining that a storage block contains a plurality of snapshots to be merged further comprises determining that the storage block has not received event data for a first time interval.

17. The method of claim 16, wherein a final merge process is executed on the storage block in response to the storage block not receiving event data for a first time interval, the final merge process comprising the repeated merging of snapshots in the storage block until only one snapshot remains.

18. The method of claim 11, said determining that a storage block contains a plurality of snapshots to be merged further comprises determining that the plurality of snapshots to be merged are frozen.

19. The method of claim 11, said determining that a storage block contains a plurality of snapshots to be merged further comprises evaluating the most recent snapshots for merging before older snapshots.

20. The method of claim 11, further comprising eliminating duplicate event data from the combined event data in the new snapshot.

* * * * *